(12) United States Patent
Wu

(10) Patent No.: US 10,414,331 B2
(45) Date of Patent: Sep. 17, 2019

(54) VEHICLE TAILLIGHT

(71) Applicant: COPLUS INC., New Taipei (TW)

(72) Inventor: Jacob Wu, Tainan (TW)

(73) Assignee: COPLUS INC., New Taipei (TW)

( * ) Notice: Subject to any disclaimer, the term of this patent is extended or adjusted under 35 U.S.C. 154(b) by 220 days.

(21) Appl. No.: 15/472,434

(22) Filed: Mar. 29, 2017

(65) Prior Publication Data

US 2017/0292674 A1    Oct. 12, 2017

(30) Foreign Application Priority Data

Apr. 12, 2016  (TW) ............................. 105111322 A
Jan. 12, 2017  (TW) ............................. 106200549 U

(51) Int. Cl.
| | | |
|---|---|---|
| B60Q 1/26 | (2006.01) | |
| B60Q 1/00 | (2006.01) | |
| F21S 43/19 | (2018.01) | |
| F21S 43/14 | (2018.01) | |
| F21S 43/27 | (2018.01) | |
| F21S 43/20 | (2018.01) | |
| F21S 43/239 | (2018.01) | |
| F21S 43/241 | (2018.01) | |
| F21S 43/243 | (2018.01) | |
| F21S 43/249 | (2018.01) | |
| F21S 43/37 | (2018.01) | |
| F21S 43/31 | (2018.01) | |
| F21S 43/40 | (2018.01) | |

(52) U.S. Cl.
CPC ......... *B60Q 1/2607* (2013.01); *B60Q 1/0052* (2013.01); *F21S 43/14* (2018.01); *F21S 43/19* (2018.01); *F21S 43/239* (2018.01); *F21S 43/241* (2018.01); *F21S 43/243* (2018.01); *F21S 43/249* (2018.01); *F21S 43/26* (2018.01); *F21S 43/27* (2018.01); *F21S 43/31* (2018.01); *F21S 43/37* (2018.01); *F21S 43/40* (2018.01)

(58) Field of Classification Search
CPC ..... B60Q 1/2607; B60Q 1/0052; F21S 43/37; F21S 43/249; F21S 43/40; F21S 43/14; F21S 43/27; F21S 43/19; F21S 43/243; F21S 43/239; F21S 43/31; F21S 43/241; F21S 43/26
USPC ........................................................ 362/511
See application file for complete search history.

(56) References Cited

U.S. PATENT DOCUMENTS

2005/0152141 A1*  7/2005  Suzuki ................. B60Q 1/0052
                                                362/241
2017/0009952 A1*  1/2017  Tai ........................ F21S 43/40

* cited by examiner

*Primary Examiner* — Anh T Mai
*Assistant Examiner* — Jessica M Apenteng
(74) *Attorney, Agent, or Firm* — Burris Law, PLLC

(57) ABSTRACT

A vehicle taillight includes a housing seat and a light cover cooperatively defining an accommodation space, and a main light emitting device disposed in the accommodation space and including first and second light emitting members capable of emitting first and second color lights, respectively, a reflective plate, an isolation portion corresponding to the second light emitting members, and a light transmitting plate having a light guide portion for transmitting a portion of the first color light rearwardly to the light cover and to guide the other portion thereof to reflect forwardly onto the reflective plate, which in turn, reflects the first color light rearwardly. A light adjusting structure guides the second color light to project rearwardly.

11 Claims, 16 Drawing Sheets

VEHICLE TAILLIGHT

CROSS-REFERENCE TO RELATED APPLICATION

This application claims priority of Taiwanese Patent Application Nos. 105111322 filed on Apr. 12, 2016 and 106200549 filed on Jan. 12, 2017.

FIELD

The disclosure relates to a vehicle light, more particularly to a vehicle taillight having different functions.

BACKGROUND

Referring to FIGS. 1 to 3, a conventional vehicle taillight 1 includes a housing 11, and two brake light emitting devices 12 and a reverse light emitting device 13 mounted in the housing 11 and arranged in a top-bottom direction. Each brake light emitting device 12 includes a base 121, a circuit board 122 disposed inside the base 121, a plurality of light emitting members 123 disposed on the circuit board 122 and arranged in a U-shape, a light guide seat 124 disposed in the base 121 and located rearwardly of the light emitting members 123, a reflective plate 125 disposed inside the light guide seat 124, a frame 126 engagingly disposed in the light guide seat 124, and a light transmitting plate 127 disposed inside the frame 126 and rearwardly spaced from the reflective plate 125. The light emitting members 123 are light emitting diodes, and different power are used to produce two shades of light with the same color but different intensities. The light transmitting plate 127 is made of a semi-reflective material to allow a portion of light to pass therethrough and the other portion of the light to reflect onto the reflective plate 125.

When the vehicle taillight 1 is located in a normal driving mode, the light emitting members 123 will emit a low-power colored light (such as red). The colored light enters the light guide seat 124, projects onto the frame 126, and then reflects onto the light transmitting plate 127. At this time, a portion of the light directly penetrates the light transmitting plate 127, while the other portion of the light is reflected by the light transmitting plate 127 onto the reflective plate 125. From the reflective plate 125, the light is again reflected onto the light transmitting plate 127, thereby resulting in gradual change of light. When the vehicle taillight 1 is shifted to a braking mode, the light emitting members 123 will emit a high-power colored light, the projecting method of which is similar to that of the low-power colored light.

Although the brake light emitting devices 12 of the conventional vehicle taillight 1 have a driving signal and a brake signal effects, the housing 11 of the conventional vehicle taillight 1 must be assembled with the reverse light emitting device 13 therein to further have a reverse signal effect. This kind of design is not only bulky and occupies space, but also increases the difficult allocation of an internal space of the housing 11.

SUMMARY

Therefore, an object of the present disclosure is to provide a vehicle taillight that can alleviate at least one of the drawbacks of the prior art.

Accordingly, a vehicle taillight of this disclosure includes a housing and a main light emitting device. The housing includes a housing seat, and a light cover coupled to a rear side of the housing seat and cooperating with the housing seat to define an accommodation space. The main light emitting device is disposed in the accommodation space and includes a main light emitting unit, a first light guide seat, a reflective seat, a light transmitting plate, and a light adjusting structure. The main light emitting unit includes a plurality of first light emitting members capable of emitting a first color light for projecting onto the first light guide seat, and a plurality of second light emitting members capable of emitting a second color light. The reflective seat and the light transmitting plate are mounted inside the first light guide seat. The reflective seat includes a reflective plate, and a hollow isolation portion disposed on the reflective plate at a position corresponding to the second light emitting members and isolating the second color light from the first color light. The light transmitting plate is made of a semi-reflective material and has a light guide portion corresponding to the reflective plate. The light adjusting structure is disposed on one of the light transmitting plate and the light cover and corresponding to the isolation portion. The light guide portion is configured to transmit a portion of the first color light rearwardly to the light cover and to guide the other portion of the first color light to reflect forwardly onto the reflective plate. The reflective plate, in turn, reflects the first color light reflected from the light guide portion rearwardly. The light adjusting structure guides the second color light to project rearwardly.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
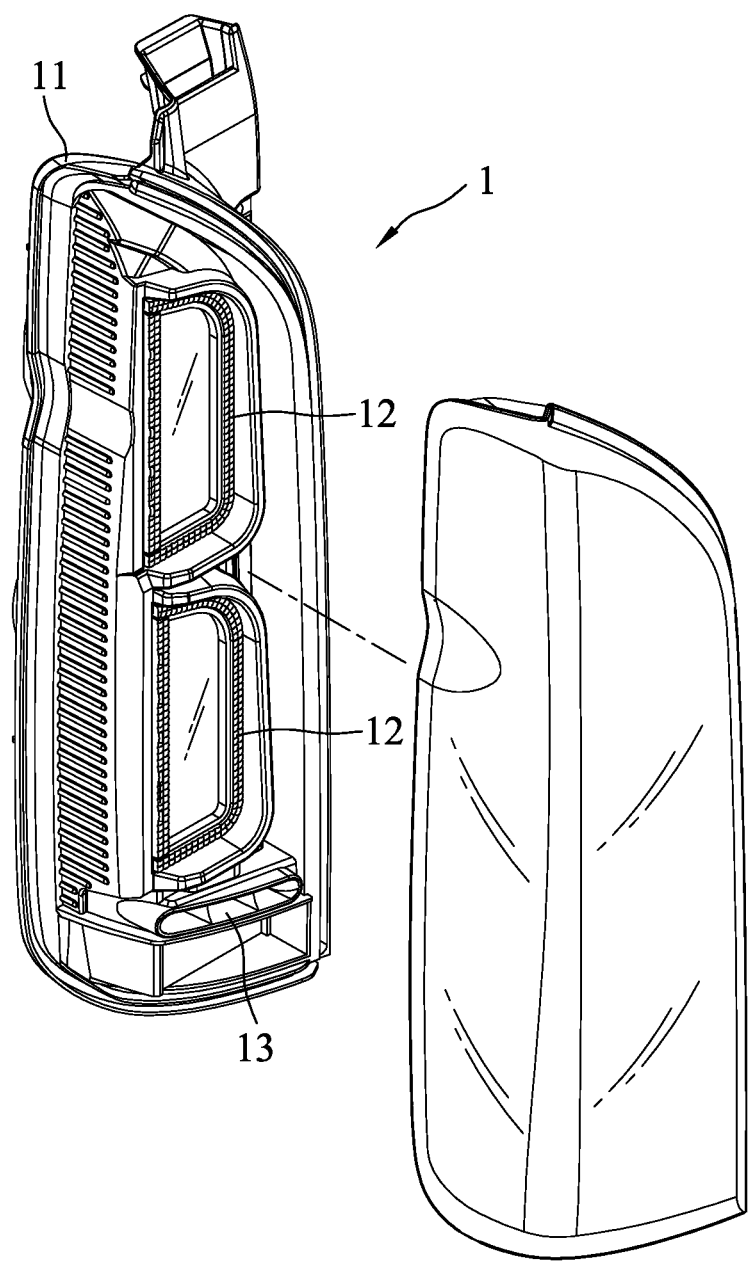
FIG. 1 is a partly exploded perspective view of a conventional vehicle taillight.
Figure 2:
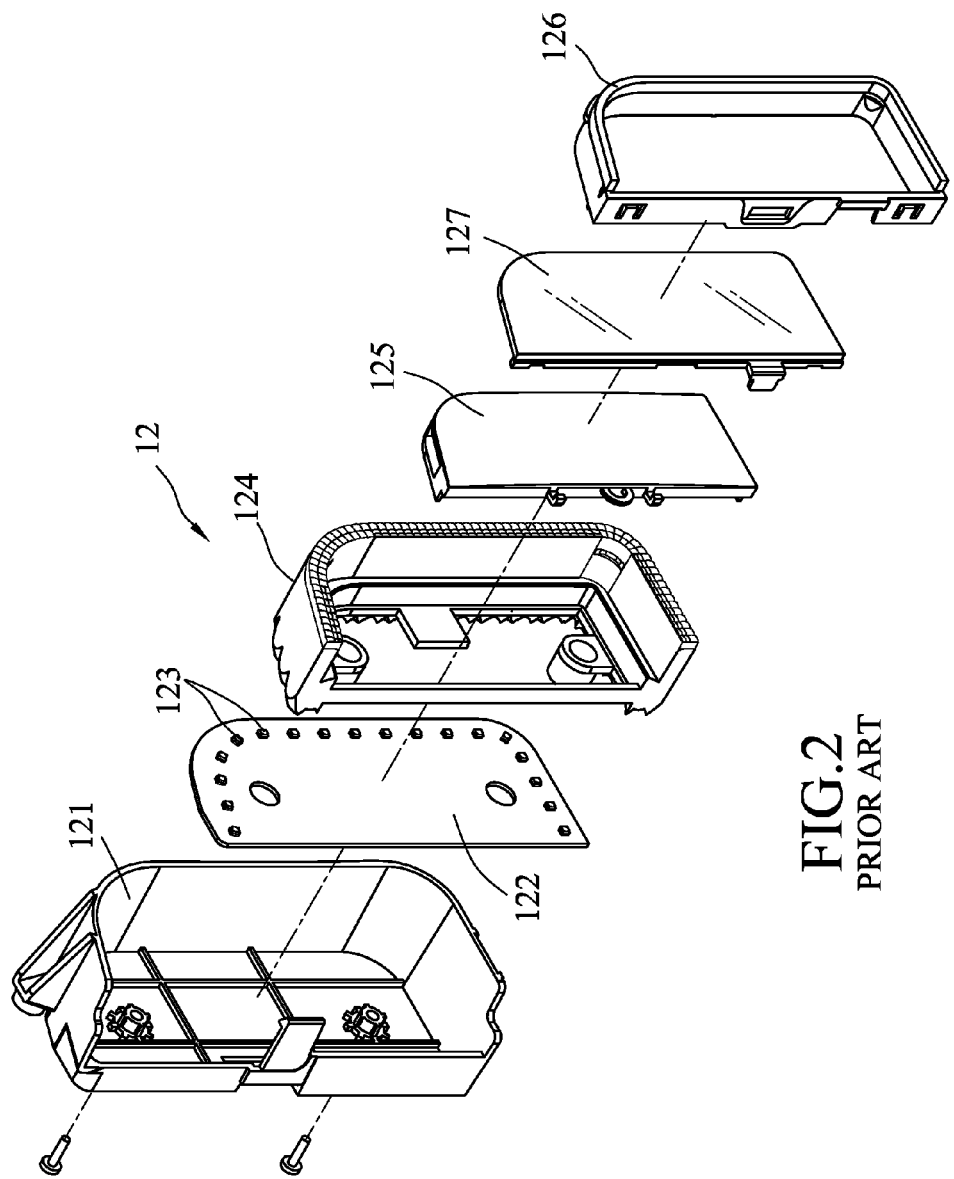
FIG. 2 is an exploded perspective view of a brake light emitting device of the conventional vehicle taillight.
Figure 3:
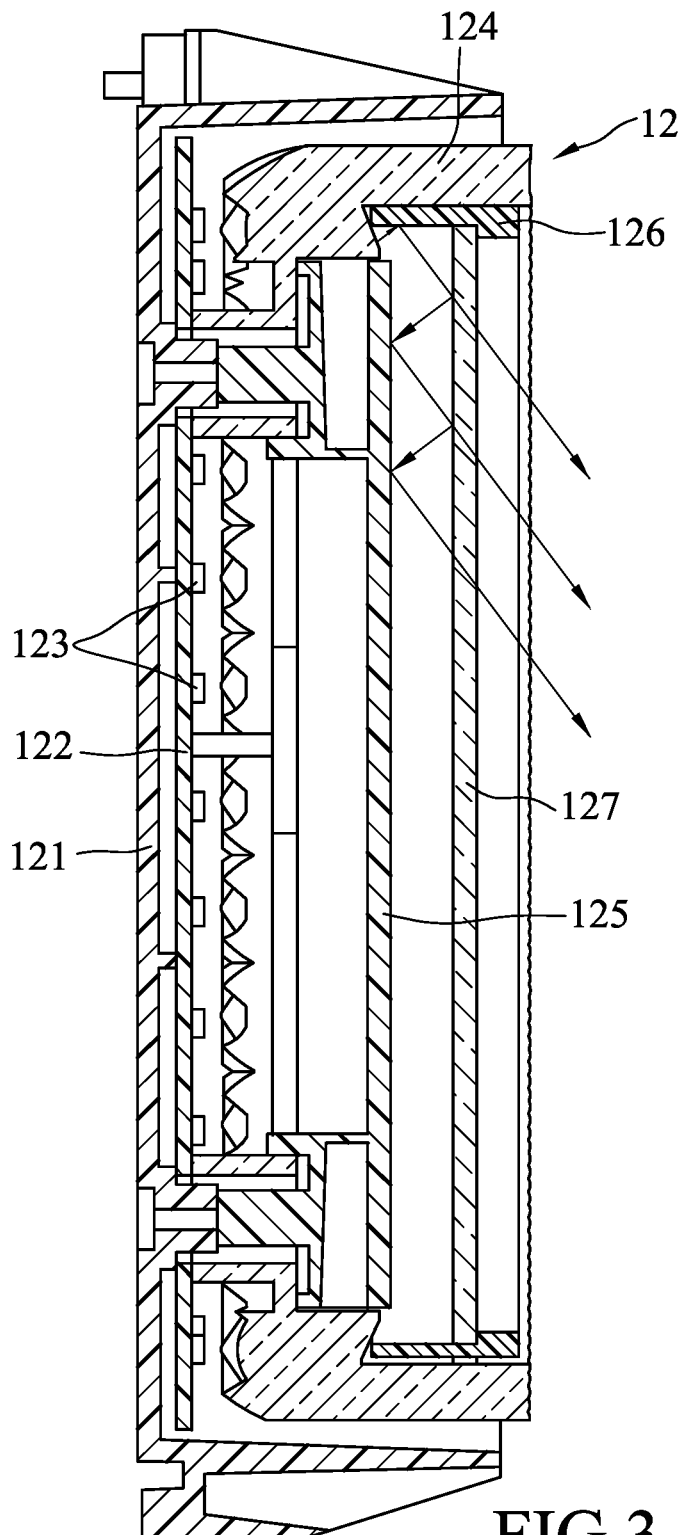
FIG. 3 is an assembled sectional view of the brake light emitting device of the conventional vehicle taillight.

Before the present disclosure is described in greater detail with reference to the accompanying embodiments, it should be noted herein that like elements are denoted by the same reference numerals throughout the disclosure.

Figure 4:
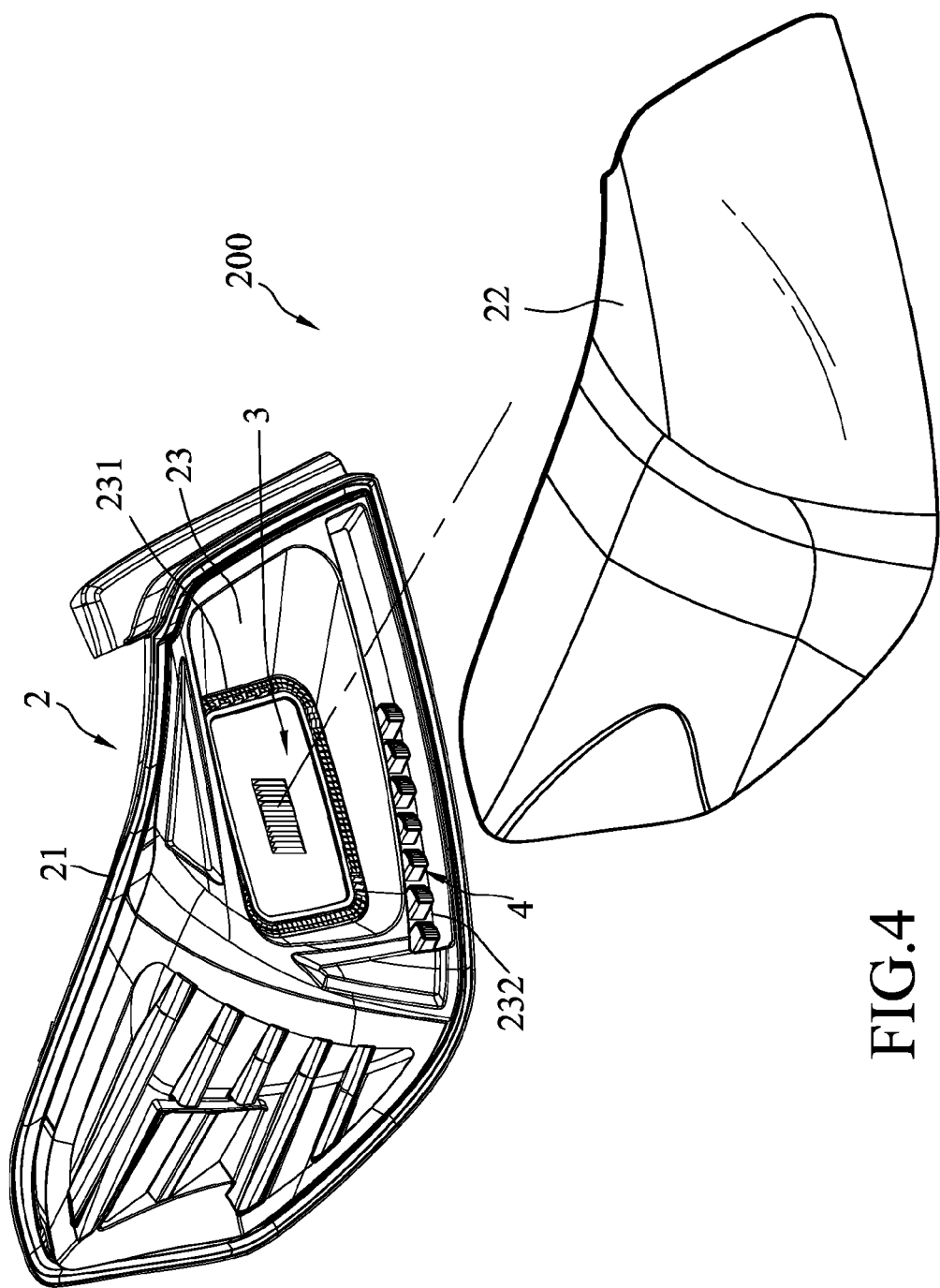
FIG. 4 is a partly exploded perspective view of a vehicle taillight according to the first embodiment of the present disclosure.
Figure 5:
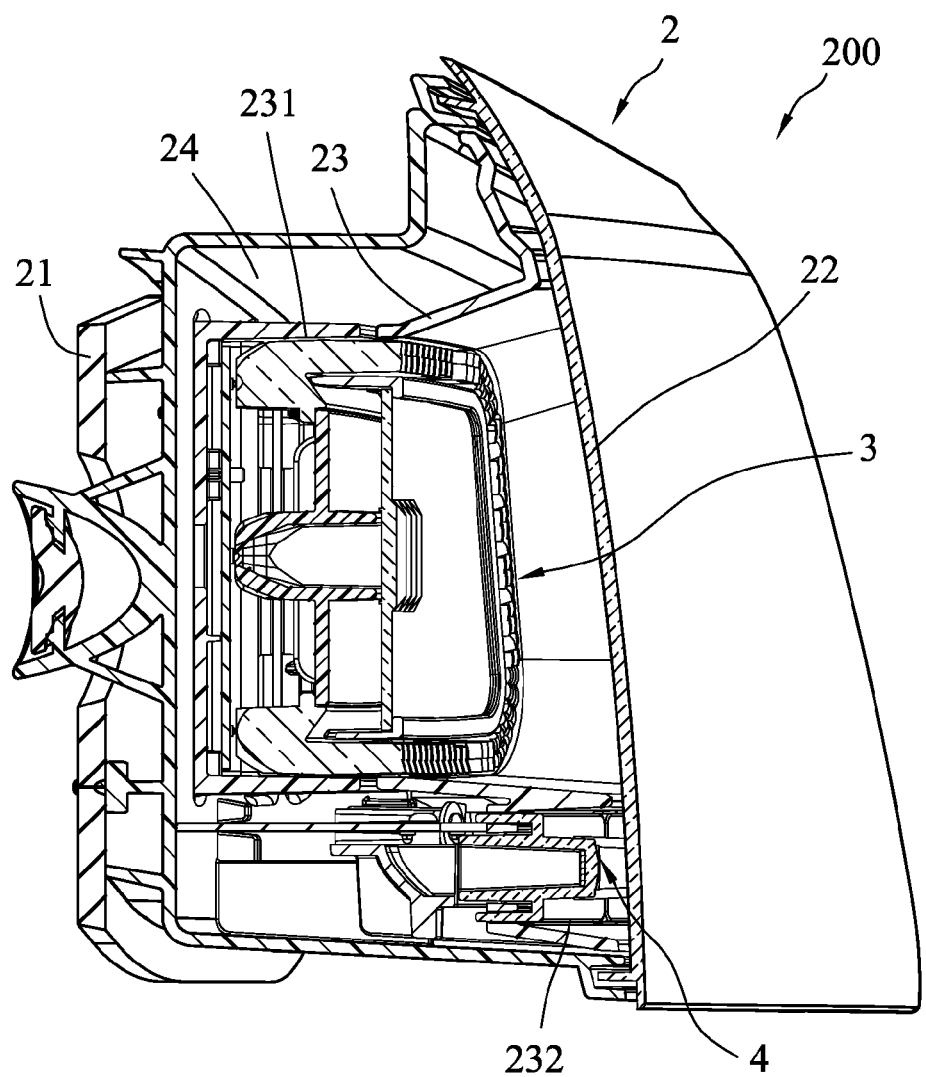
FIG. 5 is an assembled sectional view of the first embodiment.

Referring to FIGS. 4 and 5, a vehicle taillight 200 according to the first embodiment of this disclosure includes a housing 2, and a main light emitting device 3 and an auxiliary light emitting device 4 both mounted inside the housing 2. The main light emitting device 3 can generate a driving signal light shape, a brake signal light shape and a reverse signal light shape through a circuit control. The auxiliary light emitting device 4 can generate a direction or turn signal light shape.

The housing 2 includes a housing seat 21, a light cover 22 coupled to a rear side of the housing seat 21 and cooperating with the housing seat 21 to define an accommodation space 24, and a support frame 23 disposed in the accommodation space 24. The support frame 23 has a first mounting hole 231 for mounting the main light emitting device 3, and a second mounting hole 232 for mounting the auxiliary light emitting device 4. The first and second mounting holes 231, 232 of this embodiment communicate with the accommodation space 24, and are spaced apart from each other in a top-bottom direction. Alternatively, the positions of the first and second mounting holes 231, 232 may be interchanged or may be spaced apart from each other in a left-right direction.

Figure 6:
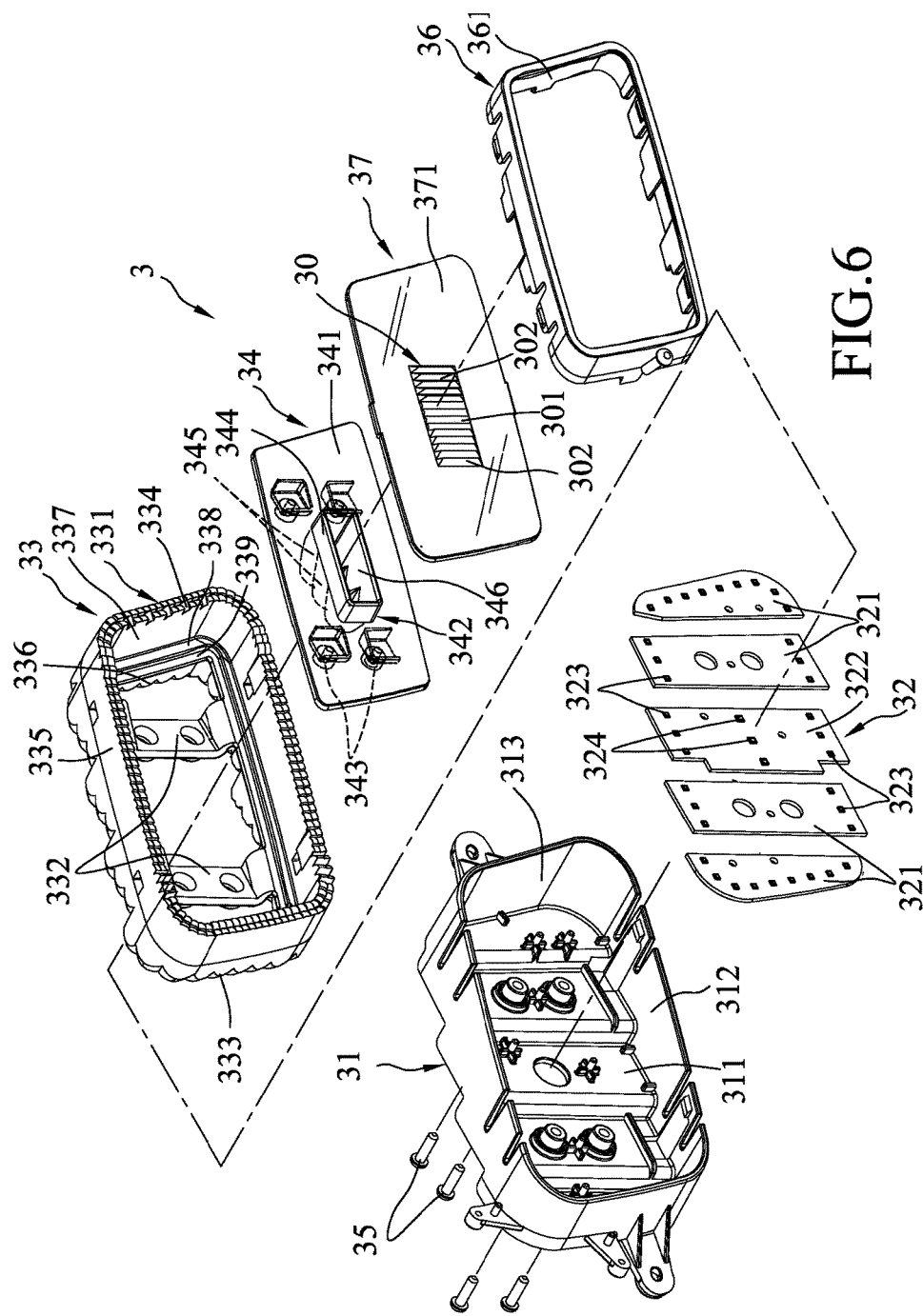
FIG. 6 is an exploded perspective view of a main light emitting device of the first embodiment.
Figure 7:
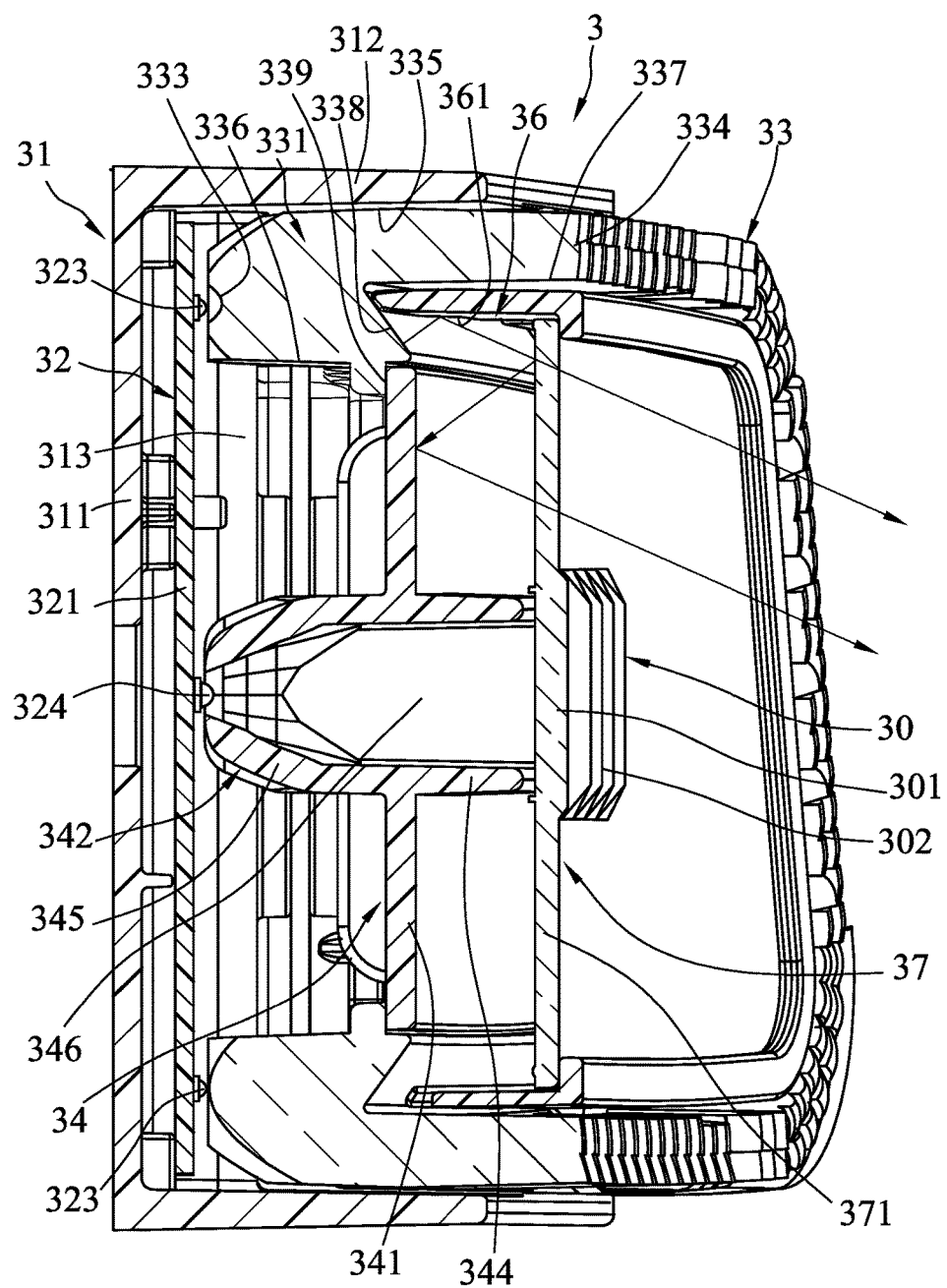
FIG. 7 is an assembled sectional view of the main light emitting device of the first embodiment.

Referring to FIGS. 6 and 7, in combination with FIG. 5, the main light emitting device 3 includes a base 31, a main light emitting unit 32, a first light guide seat 33, a reflective seat 34, an inner frame 36, a light transmitting plate 37, and a plurality of connecting members 35 connecting the main light emitting unit 32, the first light guide seat 33 and the reflective seat 34 to the base 31. The base 31 includes a base wall 311, and a surrounding wall 312 extending rearwardly and transversely from a periphery of the base wall 311 and cooperating with the base wall 311 to define a chamber 313 for accommodating the main light emitting unit 32, the first light guide seat 33 and the reflective seat 34.

The main light emitting unit 32 includes a plurality of main circuit boards 321 mounted on a rear side of the base wall 311, a plurality of first light emitting members 323 spacedly mounted on the main circuit boards 321 in proximity to peripheral edges thereof such that they form a ring shape when the main circuit boards 321 are pieced together, and a plurality of second light emitting members 324 surrounded by the first light emitting members 323. The main circuit boards 321 may be integrally formed as one piece. In this embodiment, the first light emitting members 323 is capable of emitting a first color light with different power. The first color light of this embodiment is red. In other embodiment, it may be other color. The second light emitting members 324 is capable of emitting a second color light different from the first color light. In this embodiment, the second color light is white.

The first light guide seat 33 is used to guide the first color light emitted from the first light emitting members 323, and includes an annular light guide plate 331, and two connecting pieces 332 spacedly connected to a front side of the light guide plate 331. The light guide plate 331 has a first light entry surface 333 disposed on the front side thereof and facing the first light emitting members 323, a concave-convex surface 334 disposed on a rear side of said light guide plate 331 and facing the light cover 22, an outer peripheral surface 335 connected between outer peripheral edges of the first light entry surface 333 and the concave-convex surface 334 and engaged to the surrounding wall 312, a first inner peripheral surface 336 extending rearwardly from an inner peripheral edge of the first light entry surface 333, a second inner peripheral surface 337 extending forwardly from an inner peripheral edge of the concave-convex surface 334, a first light exit surface 338 obliquely connected between a rear end of the first inner peripheral surface 336 and a front end of the second inner peripheral surface 337, and an annular protrusion 339 protruding inwardly from the first inner peripheral surface 336 toward the center thereof and proximate to the first light exit surface 338.

The reflective seat 34 includes a reflective plate 341 disposed inside the light guide plate 331 and abutting against the annular protrusion 339, a tubular isolation portion 342 disposed at the center of the reflective plate 341 and extending in a front-rear direction, and a plurality of protruding blocks 343 protruding forwardly from the reflective plate 341 at two opposite sides of the isolation portion 342 for connection with the connecting members 35. The reflective plate 341 surrounds an outer periphery of the isolation portion 342. The isolation portion 342 includes a frame area 344 protruding rearwardly from the reflective plate 341 and defining a light path space 346, and a plurality of adjacent light cup areas 345 protruding forwardly from a front end of the frame area 344 opposite to the frame area 34 and corresponding to the second light emitting members 324. The isolation portion 342 can isolate the second color light from the first color light so as to prevent interference and mixing of the first and second color lights.

The inner frame 36 is annular, is engaged to the second inner peripheral surface 337 of the light guide plate 331, and has an inner reflecting surface 361.

The light transmitting plate 37 is located rearwardly of the reflective seat 34, and is disposed on a rear edge of the reflecting surface 361 of the inner frame 36. The light transmitting plate 37 is made of a semi-reflective material, and has a light guide portion 371 corresponding to the reflective plate 341. The light guide portion 371 is configured to transmit a portion of the first color light projected from the first light guide seat 33 rearwardly to the light cover 22 and to guide the other portion of the first color light to reflect forwardly onto the reflective plate 341. The reflective plate 341, in turn, reflects the other portion of the first color light to the light guide portion 371 so as to be transmitted rearwardly to the light cover 22.

The main light emitting device 3 further includes a light adjusting structure 30 disposed or formed on the light transmitting plate 37. In this embodiment, the light adjusting structure 30 is formed at the center of the light transmitting plate 37, and has a first tooth area 301, and two second tooth areas 302 respectively disposed on left and right sides of the first tooth area 301 and extending in a rearward direction longer than the first tooth area 301. The light adjusting structure 30 can guide the second color light to project rearwardly to the light cover 22 and generate a reverse signal light shape, uniformity and angle of visibility complying with the regulations. The isolation portion 342 has a rear peripheral edge proximate to the light adjusting structure 30. The light guide portion 371 surrounds the first and second tooth areas 301, 302.

Figure 8:
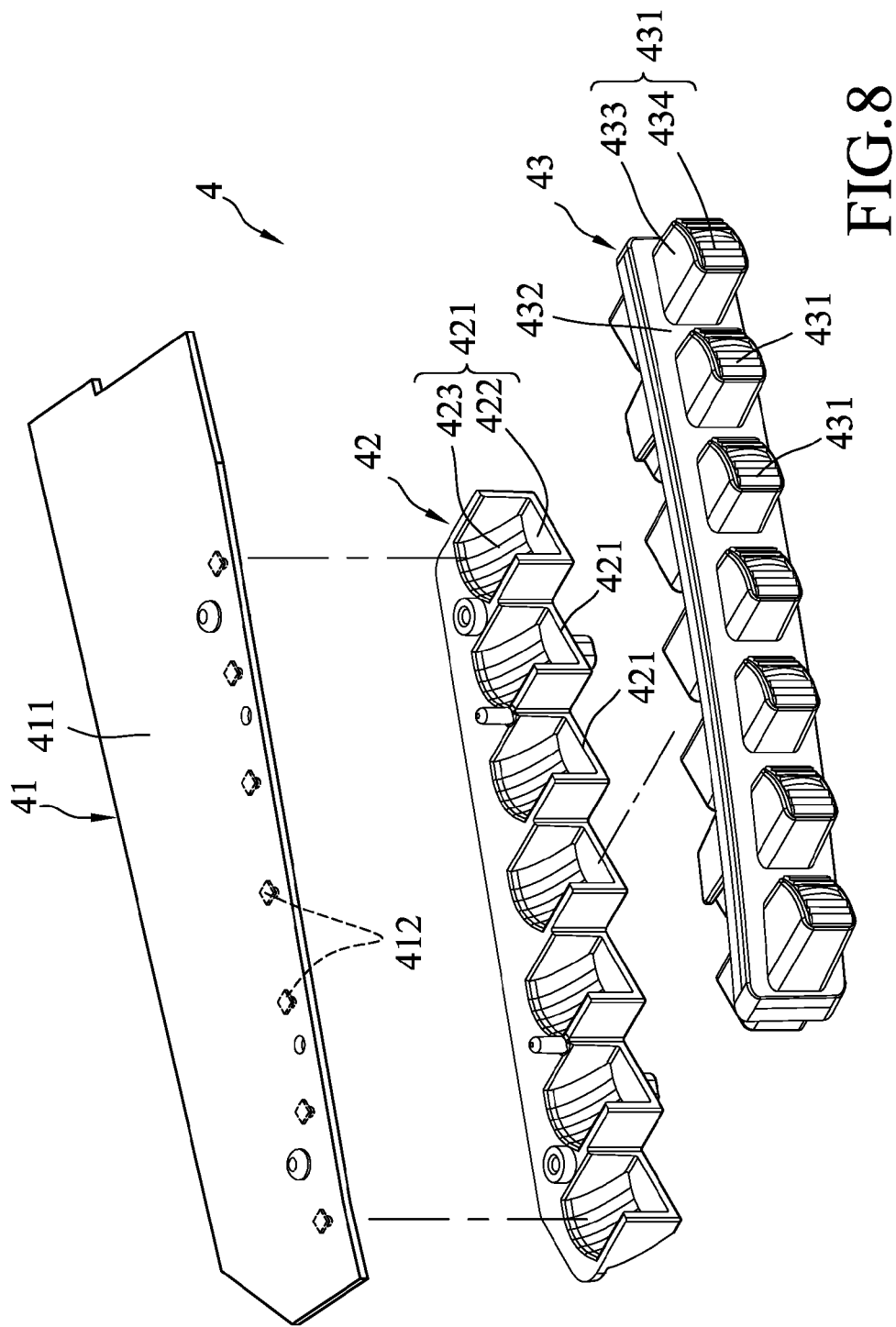
FIG. 8 is an exploded perspective view of an auxiliary light emitting device of the first embodiment.
Figure 9:
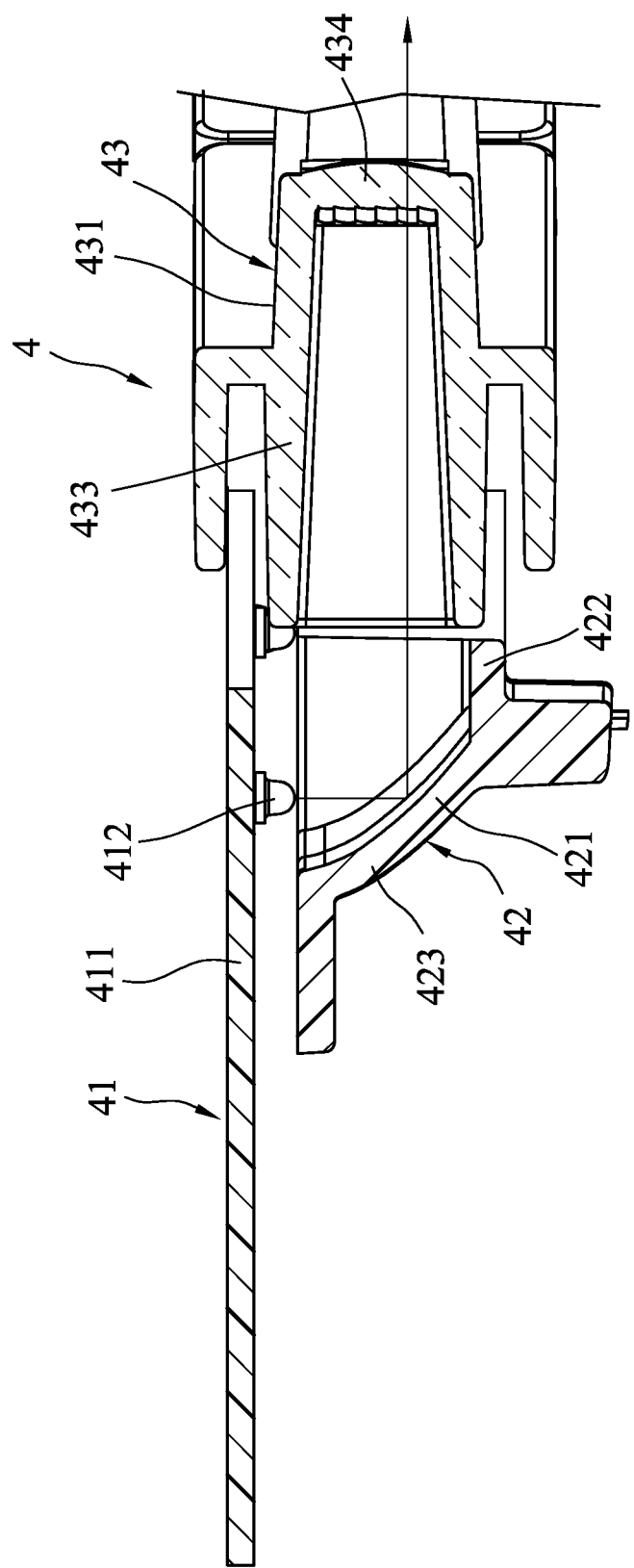
FIG. 9 is a fragmentary assembled sectional view of the auxiliary light emitting device of the first embodiment.

Referring to FIGS. 8 and 9, in combination with FIG. 5, the auxiliary light emitting device 4 includes an auxiliary light emitting unit 41, a reflective strip 42 disposed below the auxiliary light emitting unit 41, and an inner shell cover 43 disposed on a rear side of the reflective strip 42. The auxiliary light emitting unit 41 includes an auxiliary circuit board 411 mounted flatly in the housing 2, and a plurality of auxiliary light emitting members 412 mounted on the auxiliary circuit board 411 and spaced apart from each other in the left-right direction. In this embodiment, the auxiliary light emitting members 412 emit a third color light, which is orange. The reflective strip 42 has a plurality of light guide portions 421 adjacent to each other in the left-right direction for guiding the third color light to project rearwardly. Each light guide portion 421 has a bottom wall 422, and a concave-convex reflecting wall 423 extending upwardly and curvedly from a front edge of the bottom wall 422. The inner shell cover 43 has a plurality of light cover portions 431 respectively corresponding to rear sides of the light guide portions 421, and a connecting frame portion 432 interconnecting the light cover portions 431. Each light cover portion 431 includes a tubular surrounding wall 433 having front and rear ends communicating with each other, and a concave-convex rear cover wall 434 connected to the rear end of the tubular surrounding wall 433.

Referring back to FIGS. 5, 7 and 9, when the vehicle taillight 200 is located in a normal driving mode, the first light emitting members 323 emit a first color light of low power. The first color light enters the first light entry surface 333 and passes through the concave-convex surface 334 to form a ring of light. The first color light further passes through the first light exit surface 338 to project onto the reflecting surface 361 of the inner frame 36, and is then reflected toward the light transmitting plate 37. Since the light transmitting plate 37 is made of a semi-reflective material, a portion of the first color light is transmitted through the light guide portion 371 of the light transmitting plate 37 in proximity to a lateral edge thereof, while the other portion of the first color light is reflected by the light transmitting plate 37 onto the reflective plate 341. The light reflected onto the reflective seat 34 is then reflected to the light guide portion 371 of the light transmitting plate 37. Because the intensity of the first color light reflected onto the reflective seat 34 gradually decreases due to reflection, the reflected light can have a light compensation effect, and the luminosity of the light gradually decreases from an outer side toward the center. As such, not only the variability and novelty of the light can be increased, but the visual variability can also be enhanced to call the attention of a vehicle or a pedestrian behind the moving vehicle. In this embodiment, the intensity of the light can be controlled to produce light shape and brightness conforming to a moving vehicle light. Under this mode, the vehicle or pedestrian behind the moving vehicle can see the vehicle taillight 200. Hence, the vehicle taillight 200 of this disclosure has a driving signal effect.

When the driver steps on the brake pedal, the vehicle taillight 200 is switched to a brake mode. At this time, the first light emitting members 323 emit a first color light of high power to provide a brake signal. Since the light path of the high power first color light is the same as that described in the above paragraph when the vehicle taillight 200 is located in the normal driving mode, a detailed description thereof is omitted herein for the sake of brevity. The high power and the low power mentioned in this disclosure are only relative values, the magnitude of the power is set according to the requirement of the regulations.

When the vehicle taillight 200 is switched to a reverse signal mode, the second light emitting members 324 will emit the second color light which passes through the light path space 346 of the reflective seat 34, through the light adjusting structure 30, and out of the light cover 22. When the vehicle taillight 200 is switched to a turn signal mode, the auxiliary light emitting members 412 will emit a flashing third color light which will pass through the light guide portions 421 of the reflective strip 42 and then exit through the light cover portions 431 of the inner shell cover 43. Hence, the vehicle taillight 200 also has a turn signal effect.

In the vehicle taillight 200 of the first embodiment of this disclosure, the first light emitting members 323 emitting the first color light and the second light emitting members 324 emitting the second color light are integrated on the main circuit boards 321, and through the coordination of the isolation portion 342 of the reflective seat 34 and the light adjusting structure 30 to isolate the first and second color lights, not only light interference and light mixture will not occur, but also the main light emitting device 3 can have such functions as a driving signal, a brake signal and a reverse signal. Further, the main light emitting device 3 has also taken full advantage of the space, and has good integration.

Figure 10:
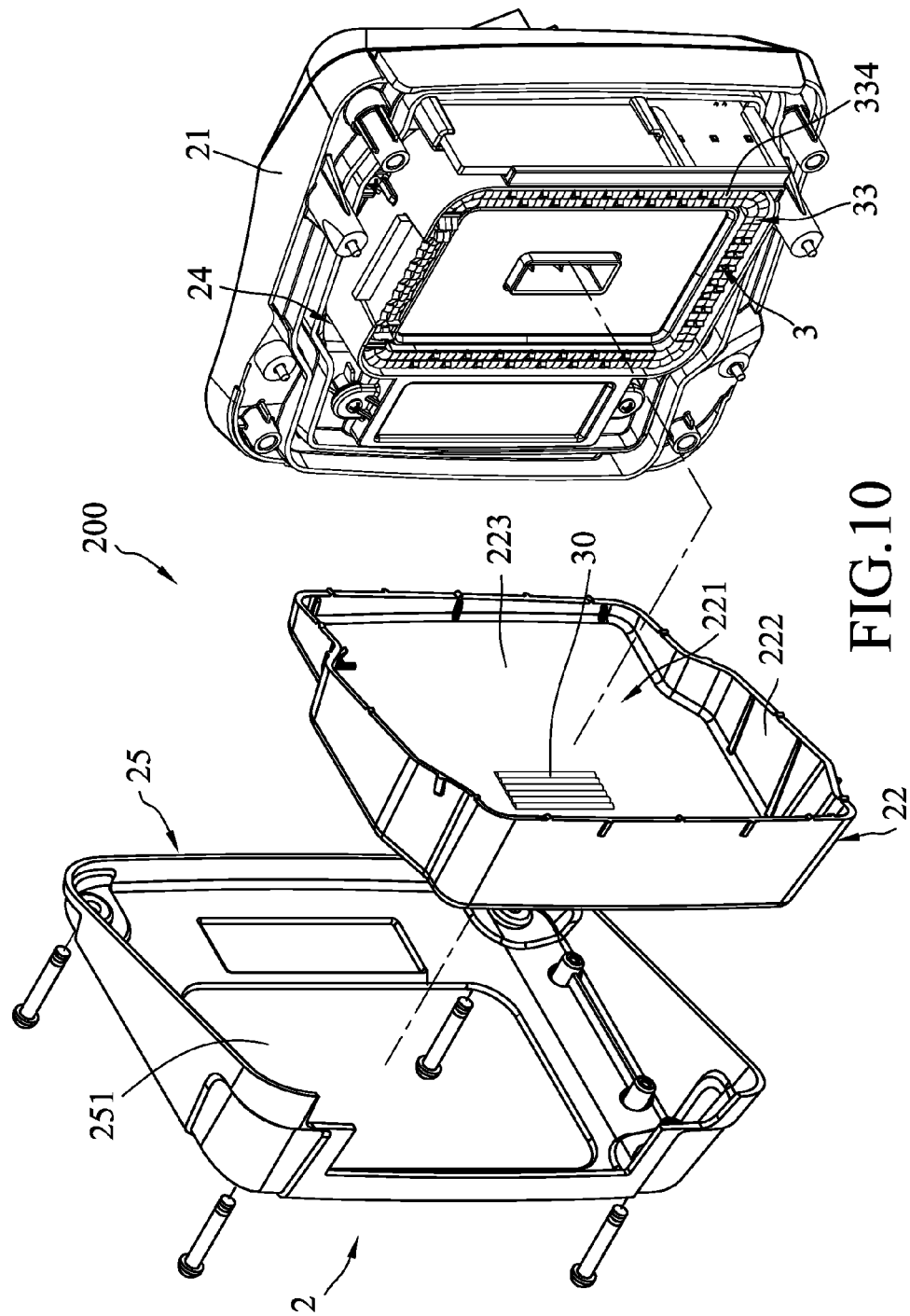
FIG. 10 is a partly exploded perspective view of a vehicle taillight according to the second embodiment of the present disclosure.
Figure 11:
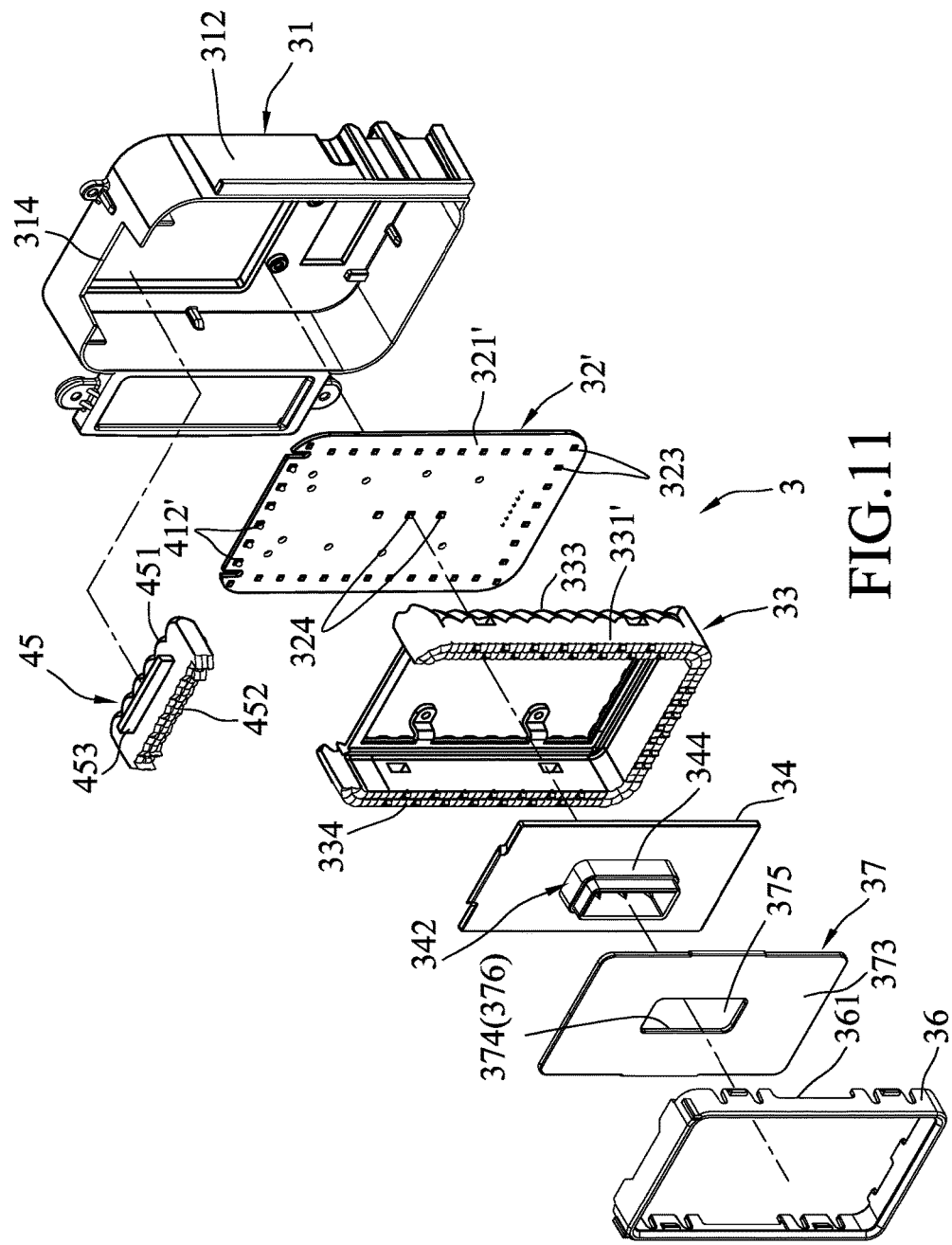
FIG. 11 is an exploded perspective view of a main light emitting device of the second embodiment.
Figure 12:
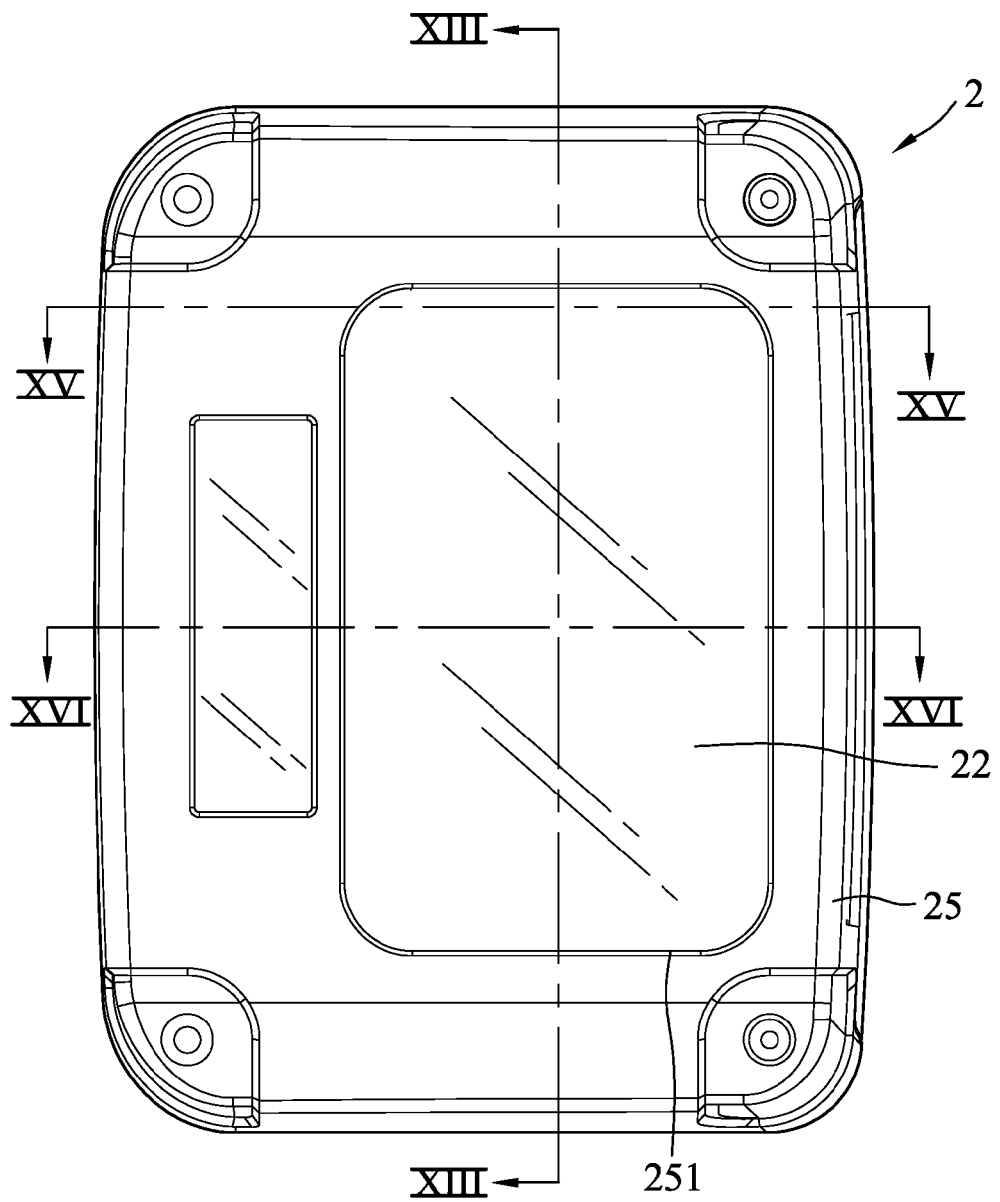
FIG. 12 is a schematic front view of the second embodiment.

Referring to FIGS. 10 to 12, the second embodiment of the vehicle taillight 200 of this disclosure has a structure substantially similar to that of the first embodiment. Particularly, the vehicle taillight 200 includes the housing 2 and the main light emitting device 3. However, in the second embodiment, the housing 2 further includes a light mask 25 disposed at a rear side of the light cover 22. The light cover 22 is made of a light transmitting material, and has a light transmitting portion 221, and a surrounding portion 222 extending transversely from a periphery of the light transmitting portion 221. The light mask 25 has an opening 251 corresponding to the light transmitting portion 221.

The light adjusting structure 30 is disposed on or integrally formed with the light transmitting portion 221 of the light cover 22. The light transmitting portion 221 has a light transmitting area 223 surrounding an outer periphery of the light adjusting structure 30. The surrounding wall 312 of the base 31 has a notch 314 formed in an upper end thereof.

Figure 13:
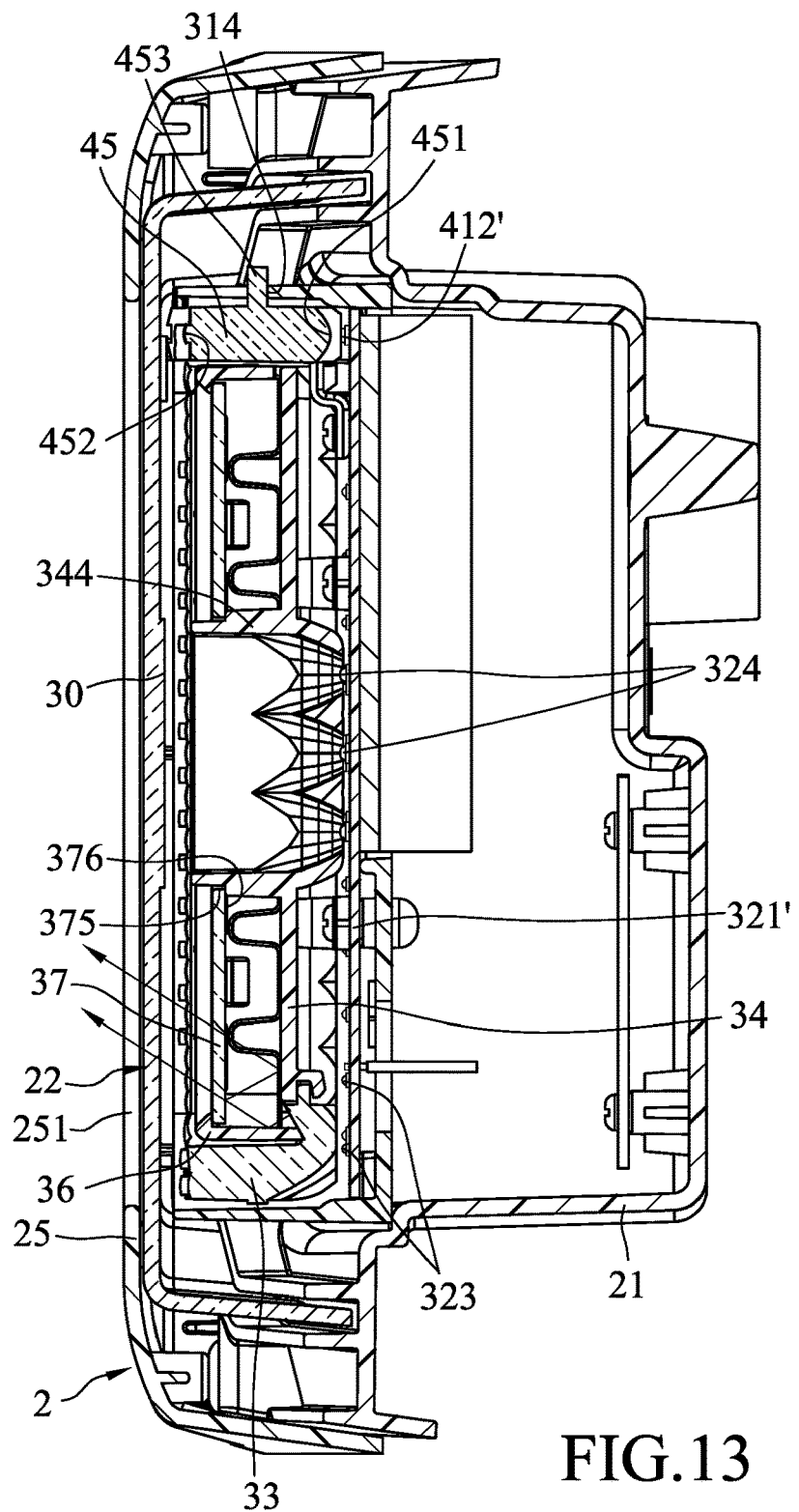
FIG. 13 is a sectional view taken along line XIII-XIII of FIG. 12.
Figure 14:
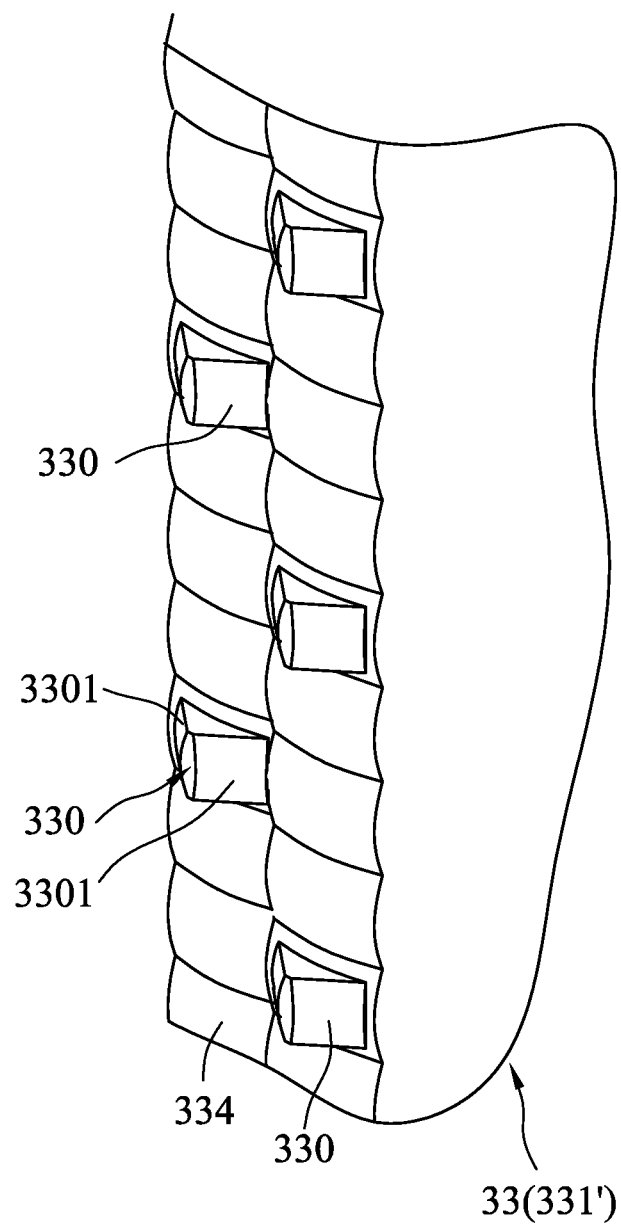
FIG. 14 is an enlarged fragmentary perspective view of a first light guide seat of the main light emitting device of the second embodiment.

Referring to FIGS. 11, 13 and 14, in the second embodiment, the light guide plate 331' of the first light guide seat 33 has a U-shaped structure with an upward opening, the concave-convex surface 334 of the light guide plate 331' corresponds to the light transmitting area 223 of the light cover 22, and the first light guide seat 33 further includes a plurality of spaced-apart light guide protruding particles 330 protruding rearwardly from the concave-convex surface 334. Each light guide protruding particle 330 has two inclined surfaces 3301 respectively facing left and right sides of the vehicle taillight 200. The inclined surfaces 3301 can alter the divergence angle of the light from the concave-convex surface 334.

The light transmitting plate 37 has a first surface 373, a second surface 374 opposite to the first surface 373, and a through hole 375 extending through the first and second surfaces 373, 374. The through hole 375 corresponds with the light adjusting structure 30. The frame area 344 of the isolation portion 342 of the reflective seat 34 extends through the through hole 375 to be positioned thereat. The light transmitting plate 37 further has a semi-reflecting film 376 connected to one of the first and second surfaces 373, 374 for reflecting a portion of the light and permitting the other portion of the light to pass therethrough. In this embodiment, the semi-reflecting film 376 is connected to the second surface 374, and surrounds a periphery of the through hole 375.

The main light emitting unit 32' of this embodiment includes a unitary main circuit board 321', and the first light emitting members 323 are arranged on the main circuit board 321' in a U-shape.

The auxiliary light emitting device 4 of this embodiment includes a second light guide seat 45 disposed on the base 31 in proximity to the upper end thereof and cooperating with the first light guide seat 33 to form a ring shape, and a plurality of auxiliary light emitting members 412' spacedly mounted on the main circuit board 321' and cooperating with the first light emitting members 323 to form a ring shape that surrounds the second light emitting members 324. The second light guide seat 45 has a second light entry surface 451 facing the main light emitting unit 32', a second light exit surface 452 proximate to the light cover 22, and a protruding block 453 between the second light entry and exit surfaces 451, 452 and protruding through the base 31 via the notch 314. The auxiliary light emitting members 412' correspond to the second light entry surface 451.

Figure 15:
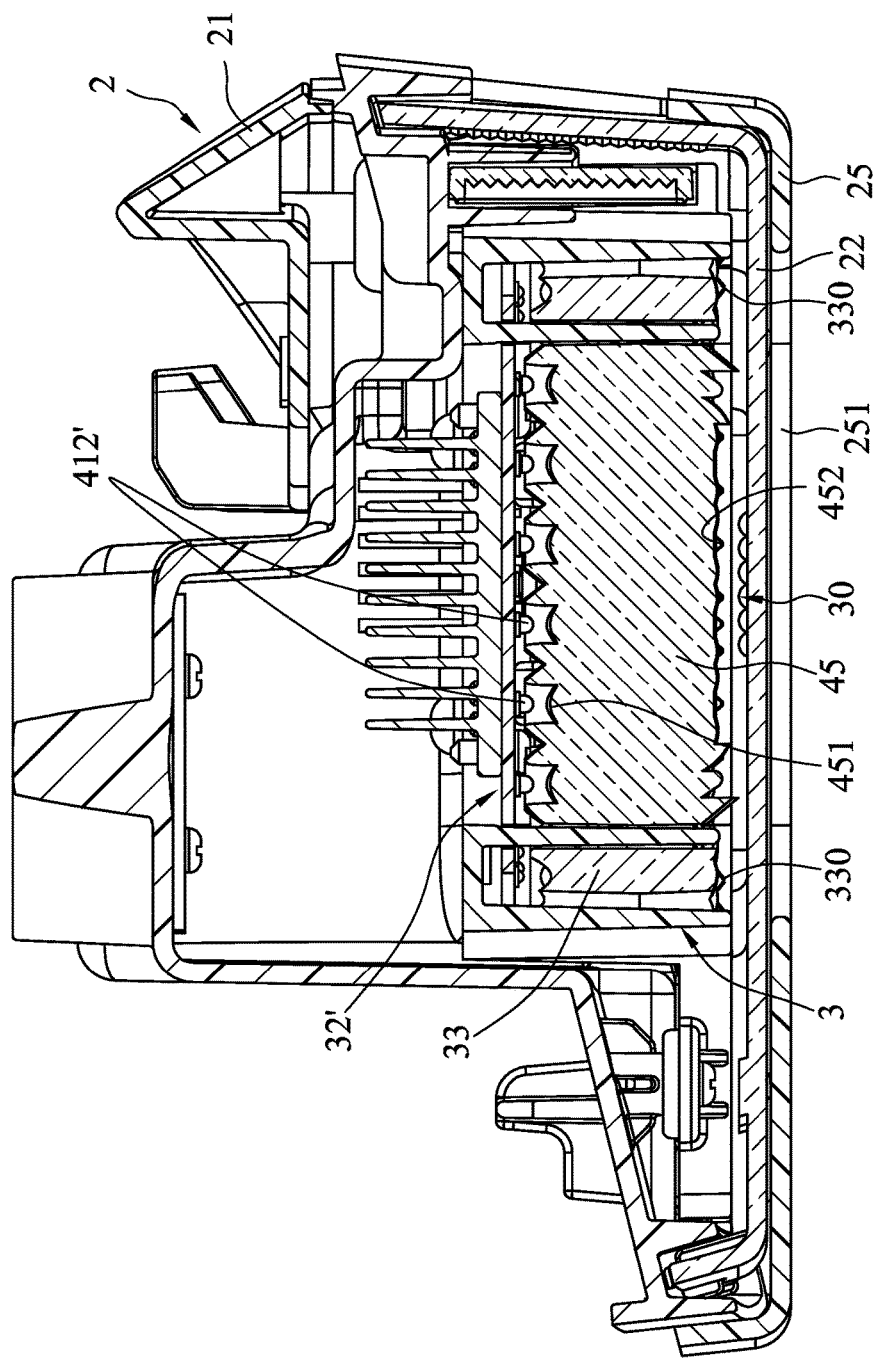
FIG. 15 is a sectional view taken along line XV-XV of FIG. 12.
Figure 16:
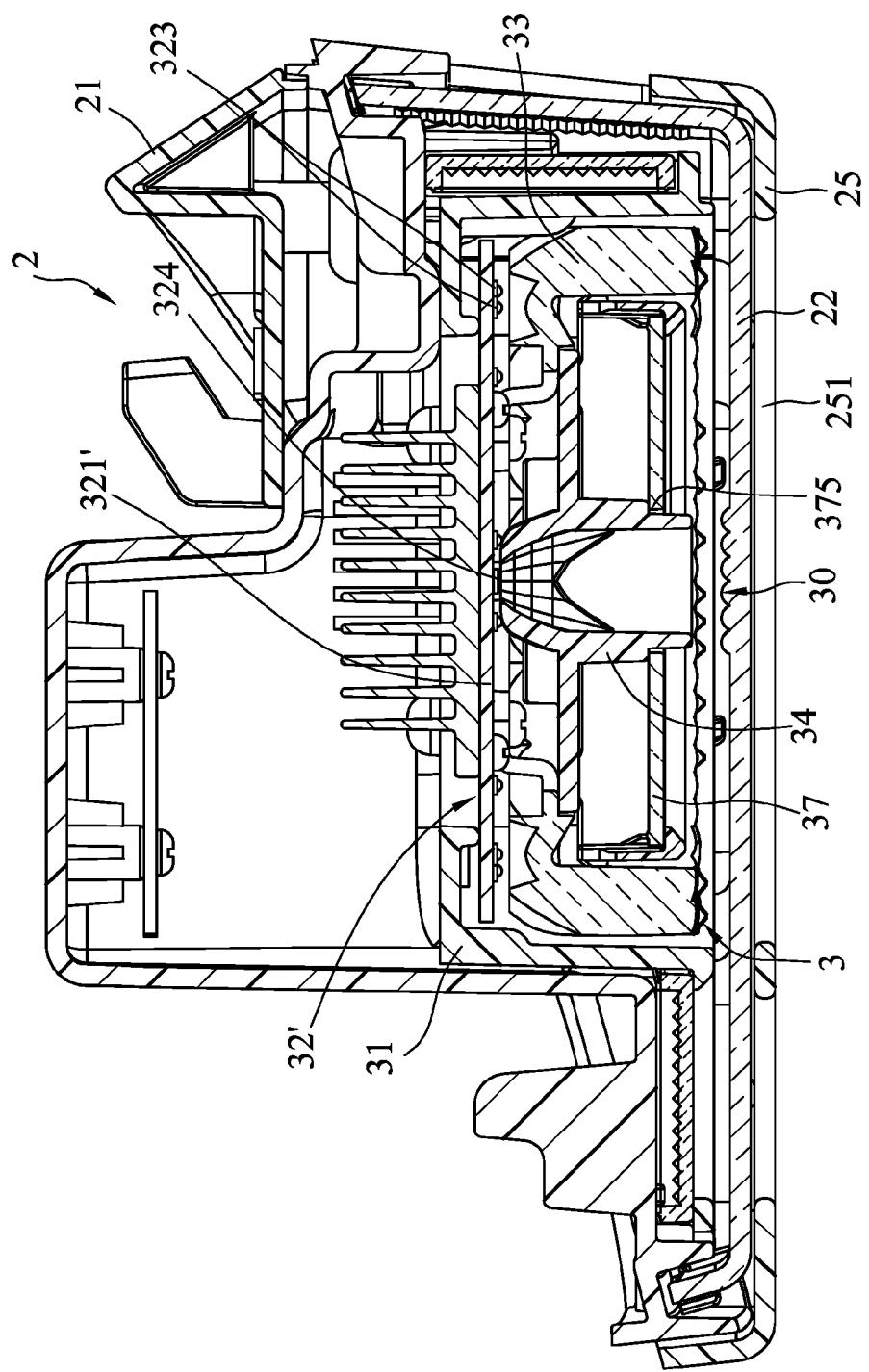
FIG. 16 is a sectional view taken along line XVI-XVI of FIG. 12.

Referring to FIGS. 14 to 16, use of the second embodiment is similar to that described in the first embodiment. Particularly, the first light emitting members 323 emit the first color light of low power when the vehicle taillight 200 is located in the normal driving mode, and emit the first color light of high power when the vehicle taillight 200 is switched to the brake mode, so that the vehicle taillight 200 has both driving and brake signal effects. Since the first light guide seat 33 has the light guide protruding particles 330, and each light guide protruding particle 330 has the inclined surfaces 3301 facing the left and right sides of the vehicle taillight 200, the divergence angle of the first color light can be further altered, so that the light shape and brightness of the light produced can comply with the requirements of the regulations. Similarly, the second color light emitted by the second light emitting members 324 can produce the color shape of the reverse signal. When the vehicle taillight 200 is switched to the turn signal mode, the third color light emitted by the auxiliary light emitting members 412' projects onto the second light entry surface 451, passes through the second light exit surface 452 and out of the light cover 22 to produce the complied color shape of the turn signal.

In the vehicle taillight 200 of the second embodiment of this disclosure, the first and second light emitting members 323, 324 and the auxiliary light emitting members 412' are integrated on the main circuit board 321'. Apart from being able to emit all the color shapes of the main light emitting device 3 and the auxiliary light emitting device 4 of the first embodiment to reduce the size of the vehicle taillight 200, the provision of the light guide protruding particles 330 in the second embodiment also facilitates adjustment of the divergence angle of the light according to the requirements of the regulations, thereby enhancing the convenient designing of the vehicle taillight 200.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A vehicle taillight comprising:
    a housing including a housing seat, and a light cover coupled to a rear side of said housing seat and cooperating with said housing seat to define an accommodation space; and
    a main light emitting device disposed in said accommodation space and including a main light emitting unit, a first light guide seat, a reflective seat, a light transmitting plate, and a light adjusting structure, said main light emitting unit including a plurality of first light emitting members capable of emitting a first color light for projecting onto said first light guide seat, and a plurality of second light emitting members capable of emitting a second color light, said reflective seat and said light transmitting plate being mounted inside said first light guide seat, said reflective seat including a reflective plate, and a hollow isolation portion disposed on said reflective plate at a position corresponding to said second light emitting members and isolating said second color light from said first color light, said light transmitting plate being made of a semi-reflective material and having a light guide portion corresponding to said reflective plate, said light adjusting structure being disposed on one of said light transmitting plate and said light cover and corresponding to said isolation portion, said light guide portion being configured to transmit a portion of said first color light rearwardly to said light cover and to guide the other portion of said first color light to reflect forwardly onto said reflective plate, said reflective plate, in turn, reflecting said first color light reflected from said light guide portion rearwardly, said light adjusting structure guiding said second color light to project rearwardly,
    wherein said isolation portion includes a frame area protruding rearwardly from said reflective plate and having a rear peripheral edge proximate to said light adjusting structure, and a plurality of adjacent light cup areas protruding forwardly from said reflective plate opposite to said frame area and corresponding to said second light emitting members.

2. The vehicle taillight as claimed in claim 1, wherein said light adjusting structure is disposed on said light transmitting plate, and has a first tooth area, and two second tooth areas respectively disposed on left and right sides of said first tooth area and extending in a rearward direction longer than said first tooth area.

3. The vehicle taillight as claimed in claim 2, wherein said first light emitting members surround said second light emitting members, said reflective plate surrounds an outer periphery of said isolation portion, and said light guide portion surrounds said first and second tooth areas of said light adjusting structure.

4. The vehicle taillight as claimed in claim 3, wherein said first light guide seat includes an annular light guide plate having a first light entry surface disposed on a front side thereof and facing said first light emitting members, a concave-convex surface disposed on a rear side of said light guide plate and facing said light cover, a first inner peripheral surface extending rearwardly from an inner peripheral edge of said first light entry surface, a second inner peripheral surface extending forwardly from an inner peripheral edge of said concave-convex surface, a first light exit surface connected between a rear end of said first inner peripheral surface and a front end of said second inner peripheral surface, and an annular protrusion protruding inwardly from said first inner peripheral surface in proximity to said first light exit surface and providing abutment for said reflective plate.

5. The vehicle taillight as claimed in claim 1, further comprising an auxiliary light emitting device disposed in said accommodation space, said auxiliary light emitting device including an auxiliary light emitting unit, a reflective strip disposed below said auxiliary light emitting unit, and an inner shell cover disposed on a rear side of said reflective strip, said auxiliary light emitting unit including a plurality of auxiliary light emitting members emitting light onto said reflective strip, said reflective strip having a plurality of light guide portions adjacent to each other in a left-right direction and guiding said light emitted from said auxiliary light emitting members to project rearwardly, said inner shell cover having a plurality of light cover portions respectively corresponding to rear sides of said light guide portions of said reflective strip, and a connecting frame portion interconnecting said light cover portions of said inner shell cover.

6. The vehicle taillight as claimed in claim 5, wherein said auxiliary light emitting unit further includes an auxiliary circuit board disposed above said reflective strip for mounting said auxiliary light emitting members, each of said light guide portions of said reflective strip having a bottom wall, and a concave-convex reflecting wall extending upwardly and curvedly from a front edge of said bottom wall, each of said light cover portions of said inner shell cover including a tubular surrounding wall having front and rear ends communicating with each other, and a concave-convex rear cover wall connected to said rear end of said tubular surrounding wall.

7. The vehicle taillight as claimed in claim 5, wherein said housing further includes a support frame disposed in said accommodation space and having a first mounting hole for mounting said main light emitting device, and a second mounting hole for mounting said auxiliary light emitting device.

8. The vehicle taillight as claimed in claim 1, wherein said light adjusting structure is disposed on said light cover, said light transmitting plate having a first surface, a second surface opposite to said first surface, a through hole extending through said first and second surfaces and corresponding to said light adjusting structure, and a semi-reflecting film connected to one of said first and second surfaces.

9. The vehicle taillight as claimed in claim 8, wherein said first light guide seat includes a light guide plate having a first light entry surface disposed on a front side thereof and facing said first light emitting members, a concave-convex surface disposed on a rear side of said light guide plate and facing said light cover, and a plurality of spaced-apart light guide protruding particles protruding rearwardly from said concave-convex surface, each of said light guide protruding particles having two inclined surfaces respectively facing left and right sides of said vehicle taillight.

10. The vehicle taillight as claimed in claim 8, wherein said first light guide seat includes a light guide plate having a U-shaped structure corresponding to said first light emitting members, said vehicle taillight further comprising an auxiliary light emitting device which includes a second light guide seat that cooperates with said first light guide seat to form a ring shape, and a plurality of auxiliary light emitting members emitting light onto said second light guide seat.

11. The vehicle taillight as claimed in claim 10, wherein said second light guide seat has a second light entry surface for receiving said third color light, and a second light exit surface proximate to said light cover.

\* \* \* \* \*